United States Patent [19]

Tamminen

[11] Patent Number: 4,816,354
[45] Date of Patent: Mar. 28, 1989

[54] ALKALINE CELL BATTERY AND METHOD FOR MANUFACTURE THEREOF

[76] Inventor: Pentti J. Tamminen, Kaskenkaatajantie 12D, Espoo, Finland

[21] Appl. No.: 165,975

[22] Filed: Mar. 9, 1988

[51] Int. Cl.[4] ............................................. H01M 6/46
[52] U.S. Cl. ................................. 429/162; 429/154; 429/159
[58] Field of Search ........................ 429/162, 153–159, 429/160, 149

[56] References Cited

U.S. PATENT DOCUMENTS

| | | | |
|---|---|---|---|
| 2,798,895 | 7/1957 | Nowotny | 429/162 |
| 2,880,259 | 3/1959 | Nowotny | 429/154 |
| 4,060,670 | 11/1977 | Tamminen | 429/154 |
| 4,505,996 | 3/1985 | Simonton | 429/162 |
| 4,525,439 | 6/1985 | Simonton | 429/162 |
| 4,554,226 | 11/1985 | Simonton | 429/153 |

FOREIGN PATENT DOCUMENTS 2097574 11/1982 United Kingdom .

Primary Examiner—Anthony Skapars
Attorney, Agent, or Firm—Wolf, Greenfield & Sacks

[57] ABSTRACT

This invention relates to a cell construction for alkaline batteries, to alkaline batteries utilizing such cells and to methods for the manufacture thereof. Each cell has a positive electrode, a negative electrode in the form of a paste contained within a sealed bag, and a dielectric positioned at least between the electrodes. The electrodes and dielectric are sealed within a flexible package and a pointed conductor is provided which is electrically connected to the positive electrode of the cell, extends therefrom, and is adapted to pierce the package and negative electrode bag of an adjacent cell to make electrical contact with the negative electrode paste of such cell when the cells are pressed together to form a battery. The invention provides improved sealing between the cells by inhibiting the denting of the packaging and negative electrode bag prior to piercing by use of a stiff supporting plate mounted to the negative electrode side of the cell. This plate may be mounted inside or outside the cell cover and is adapted to be pierced by the pin when the cells are pressed together. A suitable adhesive such as hot melt glue may be provided to secure the plate to the cell and to seal the openings caused when the pin pierces the various layers.

13 Claims, 2 Drawing Sheets

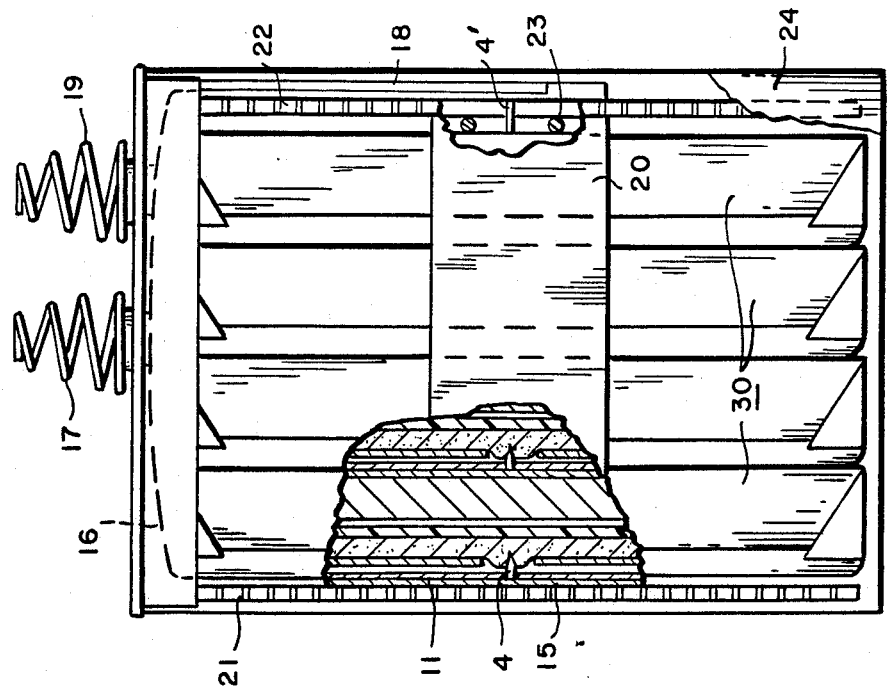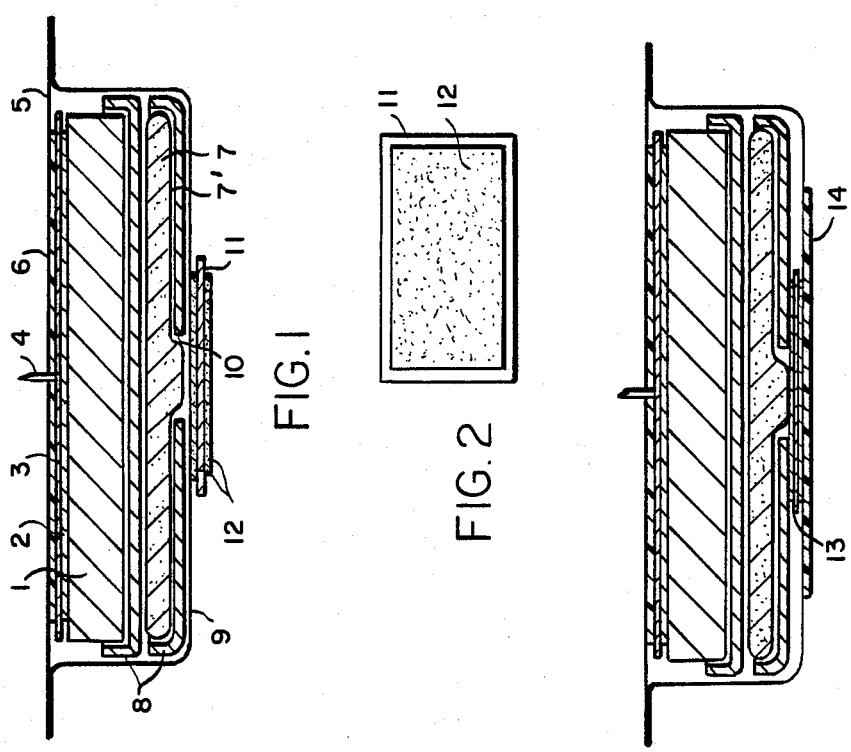

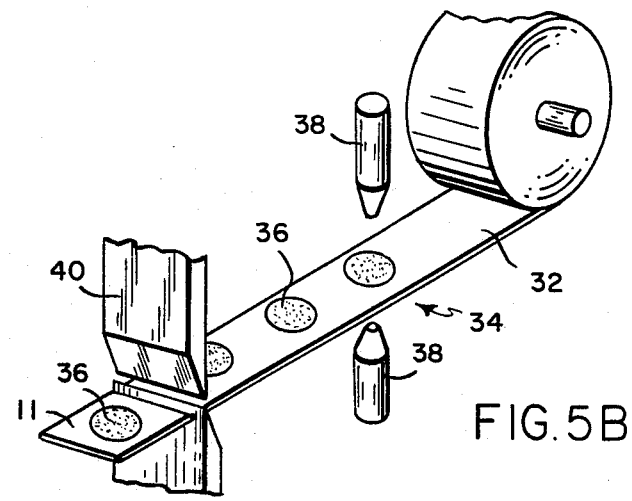
FIG. 5B
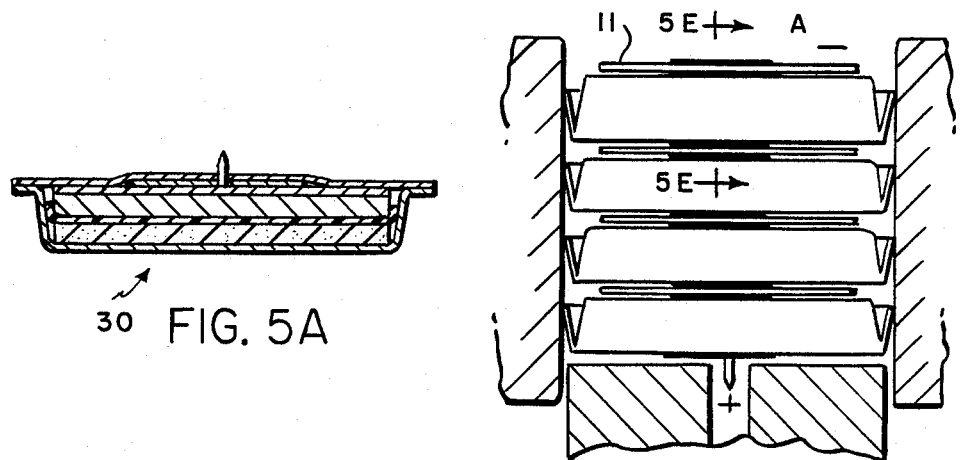
FIG. 5D
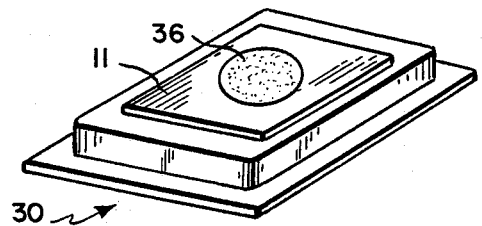
FIG. 5A
FIG. 5C
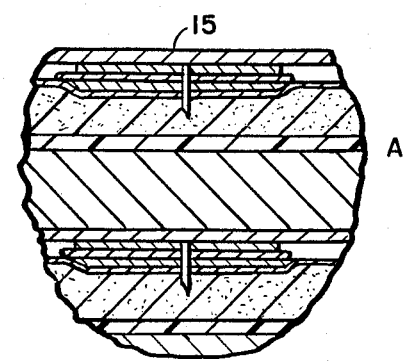
FIG. 5E

ALKALINE CELL BATTERY AND METHOD FOR MANUFACTURE THEREOF

FIELD OF THE INVENTION

This invention relates to alkaline batteries and more particularly to flat cell alkaline batteries of the type where each cell is vacuum-sealed and the cells of the batteries are connected by having a pin or other pointed conductor, which is connected to the positive electrode of one cell, pierce the vacuum-sealed package of the adjacent cell to make contact with the negative electrode thereof.

BACKGROUND OF THE INVENTION

Alkaline batteries of a desired voltage may be formed from a plurality of series-connected cells. One technique which has been used for forming such batteries is to vacuum seal a positive electrode, a dielectric, and a negative electrode in a plastic package to form a single battery cell. The negative electrode is typically formed of a pasty mixture of amalgamated zinc powder, potassium hydroxide solution, and a jelling agent sealed in a plastic bag. One method for interconnecting such cells to form a battery is to provide a pin or other pointed conductor which is electrically connected to the positive electrode of the cell and which projects through the vacuum-sealed plastic package on the positive electrode side of the cell. When the cells are stacked to form a battery, they are stacked with the negative electrode side of one cell adjacent to the positive electrode side of the next cell. As the cells are pressed together, the pointed conductor of one cell pierces the package and negative electrode bag of the adjacent cell to effect a series electrical connection between the cells. A battery of this type is described in greater detail in UK Pat. No. 2,097,574 and various modifications to this basic construction are discussed in U.S. Pat. Nos. 4,505,996; 4,525,439; and 4,554,226.

While batteries constructed in accordance with the teachings of the patents indicated above may provide satisfactory results, there is a basic drawback in the design of these batteries which has caused problems in industrial production. These problems result from the fact that the plastic foil covering the cell, which may for example be a laminate of polyamide and polyethylene, is a pliable and tough material. This material resists piercing of the contact pin or other pointed conductor. Some resistance to piercing is also provided by the bag enclosing the negative electrode. This results in the plastic foil covering, the bag, and the adhesive or other sticky material utilized for sealing the opening, being dented and deformed by the pin before piercing or breakthrough occurs. As a result, a thin sheath-like layer is formed about the contact pin by the adhesive and the various pierced material layers when the pin pierces into the negative electrode paste. This layer may provide an insulating cover over a substantial part of the surface of the contact pin which may completely prevent electrical contact from being made or may substantially limit the area of this contact and thus adversely effect the capacity of the battery.

Further, the denting of the cover layers before piercing occurs causes the soft, pasty mix of the negative electrode to yield, a pit thus being formed in the negative electrode mass as it is radially pushed outward from the penetration point. The various layers being pierced sag correspondingly, resulting in a pattern of radial grooves being formed in these layers at the moment of breakthrough. When breakthrough finally occurs, these grooves may remain as air channels directed from the contact pin outwards. Such channels may even reach the air outside the battery if the insulation between the cells is uneven or has any discontinuity or if the cells are not absolutely parallel to each other, or the pin bends slightly so that the pin enters the pierced cell at a slight angle rather than perpendicularly. The denting of the pierced layer prior to breakthrough may also cause the hole formed in these layers to be somewhat jagged rather than cleanly-cut around the pin, making it far more difficult for the resulting opening to be sealed by the adhesive or other sealing layer provided between the cells.

Since the electrolyte of alkaline batteries, such as alkaline-manganese batteries, has a tendency to creep on metallic surfaces (the Marangoni Effect), over time electrolyte from the pierced cell will tend to ooze along the metal contact pin to the radial grooves. In the assembled battery, the cells are subject to a pressure forcing them tightly together, which may gradually cause the alkaline electrolyte to creep along the grooves and between the plastic covers of the two cells out of the battery. The loss of electrolyte adversely effects the capacity of the battery, and reduces both its shelf life and active life. It has been found that the process described above begins to take place within a few hours at temperatures of $+71°$ C., the temperature used in international quality tests.

In addition to permitting the escape of electrolyte, the channels may also permit carbon dioxide, which is always present in the surrounding atmosphere, to enter the cell, thereby reacting with the electrolyte and producing alkali metal carbonate crystals which expand the leakage paths of the electrolyte from the cell. This causes deterioration in deliverable energy from the battery, and is another potential problem with existing designs.

Finally, to the extent there is difficulty in properly sealing the enlarged hole formed as a result of the denting of the pierced layers, electrolyte may flow along the contact pin into the adjacent cell, partially shorting the two cells and further reducing the output capacity of the battery.

A need therefore exists for an improved construction for alkaline batteries and the cells thereof which prevents the denting of the cover layers prior to penetration, and thus (i) permits a contact pin to enter the negative electrode paste without a covering insulating layer, thus making good electrical contact therewith; (ii) prevents pitting of the negative electrode paste so that it makes good physical and electrical contact with the pin; (iii) provides a clean, easily sealable hole in the pierced layers; and (iv) prevents formation of grooves in the pierced layers through which electrolyte may seep out and carbon dioxide containing air may enter the cell.

SUMMARY OF THE INVENTION

In accordance with the above, this invention provides a cell for an alkaline battery of the type having a positive electrode, a negative electrode in the form of a paste contained within a sealed bag, a dielectric positioned at least between the electrodes, a flexible package in which the electrodes and dielectric are sealed, and a pointed conductor connected to the positive electrode of the cell and adapted to pierce the package and negative electrode bag of an adjacent cell to make electrical contact with the negative electrode paste of such cell when the cells are pressed together. The invention involves a structure for providing a seal for the pierced cell, which structure includes a means operative for inhibiting denting of the negative electrode bag and the package adjacent thereto of the pierced cell by the pointed conductor when the cells are pressed together and means for mounting the inhibiting means to the negative electrode side of the package. For preferred embodiments, the inhibiting means is a supporting plate of a substantially stiff nonconducting material, such as a plastic, which may be easily punctured by the pointed conductor. Preferably, an adhesive layer is provided between the plate and the package for securing the plate to the package, the adhesive layer also performing a sealing function. The adhesive layer, which is preferably a hot melt glue, may be applied to both sides of the plate which may be positioned between the two cells, the two adhesive layers securing the cells together and sealing against any leakage. The plate may either be mounted outside the package as described above, or may be mounted inside the package.

Two or more cells of the type indicated above may be mounted in a stack with the pointed conductor of one cell of each adjacent pair of cells piercing the negative electrode bag and adjacent package of the other cell of the pair to form an alkaline battery. The battery would include means for making electrical connection to the pointed conductor extending from the cell at one end of the stack and a means for making electrical connection to the negative electrode of the cell at the other end of the stack.

Alkaline batteries of the type indicated above may be fabricated by stacking the negative electrode, dielectric and positive electrode in a plastic cup-shaped container, vacuum-sealing the cell container with a plastic top and mounting the pointed conductor, either before or after the vacuum sealing step, to be in electrical contact with the positive electrode and to project through the plastic top. The three steps indicated above result in the forming of a battery cell. Adhesive is coated as a continuous layer or at selected intervals on both sides of a stiff plastic material fed from a roll, the plastic material is cut to suitable lengths, for example substantially midway between each point where adhesive is coated, to form the support plates, a support plate is mounted to the side of each cell opposite the side from which the pointed conductor projects (i.e. to the negative conductor side of the cell), and a predetermined number of the cells are stacked with the pointed conductor of one cell adjacent to the supporting plate side of the next cell, the stacking being performed with sufficient pressure to cause the pointed conductor of each pair of adjacent cells to pierce the supporting plate, plastic top and negative electrode bag of the adjacent cell.

The foregoing and other objects, features and advantages of the invention will be apparent from the following more particular description of preferred embodiments of the invention as illustrated in the accompanying drawings.

IN THE DRAWINGS

FIG. 1 is a side sectional view of an alkaline battery cell in accordance with a first embodiment of the invention.

FIG. 2 is a top view of a supporting plate suitable for use in the embodiment of the invention shown in FIG. 1.

FIG. 3 is a side sectional view of a second embodiment of the invention.

FIG. 4 is a side view partially in section of a four-cell battery utilizing the cells of FIG. 1.

FIGS. 5A–5E are various views illustrating certain steps in the fabrication of a battery of the type shown in FIG. 4.

DETAILED DESCRIPTION

Referring to FIG. 1, the positive electrode of the cell is of standard construction of the type shown in the prior art patents previously discussed, and may, for example, consist of a hard-pressed mass tablet 1, of for example $MNO_2$, an electrically conductive, water repellant, carbon mix layer 2, and a steel plate 3 to which is welded a steel conductor pin 4. The distal end of the pin comes to a sharp point. A cover plastic foil 5 is provided over the positive electrode and is vacuum-sealed to cup 9 of a plastic foil to form the cell package. A thin layer of an insulating paste 6, such as for example a sticky latex bitumen or hot melt glue, is provided between plate 3 and foil layer 5. Layer 6 seals the positive end of the cell, preventing electrolyte from getting access to and leaking through the point where pin 4 penetrates cover foil layer 5.

The negative electrode 7 is a paste of amalgamated zinc powder, KOH solution and a jelling agent such as CMC. This paste is formed in accordance with known alkaline battery technology and is enclosed within a flat bag 7' of uniform thickness and known design. Bag 7' may for example be a heat-sealable plastic fibre foil bag of the type discussed in connection with FIG. 6 of U.S. Pat. No. 4,487,821. Positioned on both sides of electrode bag 7' are cup-formed layers 8 of an electrolyte-absorbing felt material such as rayon, which is reinforced with polypropylene fibers. The layers 8 are saturated with a suitable alkaline electrolyte such as an alkaline metal hydroxide (KOH) solution. The electrolyte absorbing felt material 8 should be in the order of 200 $g/m^2$ so as to provide a proper amount of free electrolyte on both sides of the negative electrode paste 7 to insure effective diffusion of OH ions to the negative electrode. This makes the practical efficiency of the negative electrode as high as 80% to 95%, depending on the discharge current.

The two electrodes and the dielectric cups are stacked in plastic foil cup 9, which acts as the cell cover, before the cell is vacuum-sealed with cover foil layer 5. The lower electrolyte felt 8 has a die-cut round hole 10 formed in its middle in order to facilitate the passing through of contact pin 4 of an adjacent cell. When, as a last step in assembling the cell, the cover foil 5 is sealed in a vacuum along the borders of cup 9, a hermetically-sealed cell is formed. This permits atmospheric pressure to mold bag 7', producing a lens-like formation at the hole 10 where contact pin 4 may penetrate into negative electrode 7 when the battery is assembled.

In accordance with the teachings of this invention, a supporting plate 11 is fixed in the middle of cup 9 on the outside thereof. As will be discussed in more detail later, plate 11 may be fixed to cup 9 by hot melt glue 12. Plate 11 is formed of a stiff plastic which may easily be punctured by the pin 4. Examples of plastics suitable for plate 11 might be an 0.15 mm to 0.4 mm thick piece of plastic of PVC, shockproof polystyrene, HD polyethylene, or polypropylene. The exact material and dimensions will vary with battery type, and may be optimized experimentally. While in FIG. 2, supporting plate 11 is shown as being rectangular, the plate may be round, square, oval, or have some other shape. As may be seen in FIG. 3, the plate bulges outward slightly in the middle in order to prevent it from becoming dented inwards when a contact pin 4 is pushed through. The stiffness of plate 11 may also be enhanced by heat forming a crisscross grid pattern in the plate using known techniques.

The dimensions of the plate 11 may be such that the plate covers roughly half the area of the cell with the center of the plate at a point substantially over the center of the cell. The sealing layer 12 does not need to be as large as is shown in FIG. 2, and may in fact be only a circular spot located at the center of the plate and having a diameter roughly equal to the shortest distance from the center of the plate to an edge of the plate.

Referring to FIGS. 5A–5E, it is seen that a battery in accordance with a preferred embodiment of the invention is constructed by assembling a vacuum-sealed cell 30 (FIG. 5A) in the manner previously described and by at the same time feeding a tape or roll 32 (FIG. 5B) of a material suitable for use as the plates 11 past a station 34 where hot melt glue 36 is applied at selected intervals (or continuously) to both sides of the tape, utilizing standard equipment such as nozzles 38. Tape 32 is then cut at points substantially midway between each hot melt glue spot 36 (or at other selected intervals) by cutters 40 to form plates 11. Cells 30 are positioned with their negative electrode side adjacent to the plates 11 and a plate 11 with the hot melt glue spots 36 thereon is positioned at the center of the negative electrode side of each cell as shown in FIG. 5C. The hot melt glue spot secures the plate to the cell and functions as the layer 12 previously described. Referring to FIG. 5D, each cell, after the plate 11 is mounted thereto, is then stacked in a suitable fixture. Additional cells 30 are then mounted on top of each other with the pin 4 of each cell piercing the plate 11, cover 9 and bag 7' of the adjacent cell to make contact with negative electrode 7 thereof (FIG. 5E). The hot melt glue spot 36 on the top of each plate 11 is operative to secure the cell to which the plate is mounted to the adjacent cell, and provides a further seal to prevent any possible electrolyte leakage between the cells.

FIG. 4 shows a battery formed according to the teachings of this invention. Assuming each of the four cells of this battery is adapted to provide a 1.5 V output, this battery would provide a 6 V output. Additional cells could be provided if a higher voltage output is desired. A negative end plate 15 is provided, which is a steel plate to which a contact pin 4 is fused, soldered, or formed as an integral part. A metal strip 16 is welded to plate 15 and connected to negative contact spring 17. Pin 4 makes contact with the negative electrode in the same manner that pins 4 of the various cells make contact with this electrode. From FIG. 5D it is seen that a plate 11 is provided on the negative side of the topmost electrode of the stack through which the pin 4 of plate 15 passes.

At the positive side of the battery, contact pin 4' of the bottom-most cell is partly cut and is connected by soldering, welding, fusing or other suitable means to a metal strip 18 leading to the positive contact spring 19. The stack of cells 30 is secured together with a band 20 between two cardboard plates 21 and 22, and a soft 0-ring 23 is provided around contact pin 4' to effect a reliable seal without causing excessive pressure to be applied to the cells, which pressure might cause electrolyte to be squeezed from cups 8 and out of the area where it is required. Reducing squeezing of electrolyte also reduces the likelihood of electrolyte leaking from the cell. The entire assembly is then mounted in a standard sealed casing 24, this step being accomplished in standard manner.

FIG. 3 illustrates a battery cell for an alternative embodiment of the invention in which the supporting plate 13 is placed inside cell cover 9 rather than outside as shown in FIG. 1. Plate 13 may be loose, or it may be fixed to cover 9 by a hot melt glue, by heat sealing, by being ultrasonically fused before the formation of the battery cup or afterwards, or by other suitable means. The arrangement shown in FIG. 4 has the advantage that the supporting plate is operative to clean the contact pin of insulating glue before penetrating into negative electrode 7. This provides added assurance that good contact will be made between the pin and the negative electrode over the entire area of the pin. However, with this embodiment of the invention, an additional operation is needed to provide an insulating layer 14 at the outside of cover 9 in order to secure a leak-proof passage of contact pin 4 into the cell. This embodiment of the invention thus does not lend itself to automated construction of the type previously described as easily as does the embodiment of FIG. 1.

While the invention has been particularly shown and described above with reference to preferred embodiments, it is apparent that, for example, thinner plates may be provided on both the inside and outside of cover 9 rather than utilizing a single plate (11 or 13) as shown in FIGS. 1 and 3. Further, the method of securing the plate to the cover for both embodiments of the invention may vary, and may include, for example, various fusing techniques. However, in all instances, this invention provides a means for preventing, or at least substantially inhibiting, denting of the cover 9, and preferably of the bag 7'0 when pin 4 is pressed against and ultimately punctures the negative side of the cell while still assuring good sealing of the punctured cell. With this limitation, the foregoing and other changes in form and detail may be made by one skilled in the art while still practicing the teachings of this invention.

What is claimed is:

1. In a cell for an alkaline battery of the type having a positive electrode, a negative electrode in the form of a paste contained within a sealed bag, a dielectric positioned at least between the electrodes, a flexible package in which the electrodes and dielectric are sealed and a pointed conductor connected to the positive electrode of the cell and adapted to pierce the package and the negative electrode bag of an adjacent cell to make electrical contact with the negative electrode paste of such cell when the cells are pressed together, thereby electrically connecting the two cells; a structure for enhancing sealing for the pierced cell comprising:

a supportive plate for inhibiting denting of the negative electrode bag and the package adjacent thereto of the pierced cell by the pointed conductor when the cells are pressed together; and means for mounting said plate to the negative electrode side of said package.

2. A structure as claimed in claim 1 wherein said supporting plate is formed of a substantially stiff non-conducting material which may be easily punctured by the pointed conductor.

3. A structure as claimed in claim 2 wherein said plate is formed of plastic.

4. A structure as claimed in claim 2 wherein said plate bulges outward slightly at its center.

5. A structure as claimed in claim 2 wherein said plate has a predetermined grid pattern formed therein to improve its stiffness.

6. A structure as claimed in claim 2 wherein said mounting means includes an adhesive layer between the plate and the package for securing the plate to the package, said adhesive layer also performing a sealing function.

7. A structure as claimed in claim 6 wherein the adhesive layer is a hot melt glue.

8. A structure as claimed in claim 6 wherein the adhesive layer is applied to both sides of said plate.

9. A structure as claimed in claim 2 wherein said mounting means mounts the plate outside the package, said mounting means including means for securing the plate to the package.

10. A structure as claimed in claim 2 wherein said mounting means mounts the plate inside the package; and
including means mounted to the negative side of the cell for providing a seal about a pointed conductor entering the cell.

11. An alkaline battery comprising a plurality of cells of the type claimed in claim 1, said cells being mounted in a stack with the pointed conductor of one cell of each adjacent pair of cells piercing the negative electrode bag and adjacent package of the other cell of the pair; and
including means for making electrical connection to the pointed conductor extending from the cell at one end of the stack; and
means for making electrical connection to the negative electrode of the cell at the other end of the stack.

12. A battery as claimed in claim 11 wherein each cell includes a supporting plate of a substantially stiff non-conducting material which may be easily punctured by the pointed conductor; and
wherein the pointed conductor of said one cell also pierces the supporting plate of said other cell.

13. A battery as claimed in claim 12 wherein said negative electrode connection means includes a pointed conductor adapted to pierce the negative electrode bag, adjacent package and supporting plate of said other-end-of-the-stack cell.

* * * * *